United States Patent
Doerr et al.

(10) Patent No.: US 6,556,736 B2
(45) Date of Patent: Apr. 29, 2003

(54) DYNAMIC PASSBAND SHAPE COMPENSATION OF OPTICAL SIGNALS

(75) Inventors: Christopher Richard Doerr, Middletown, NJ (US); Hyang Kyun Kim, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/906,965

(22) Filed: Jul. 17, 2001

(65) Prior Publication Data

US 2002/0106143 A1 Aug. 8, 2002

Related U.S. Application Data

(60) Provisional application No. 60/226,224, filed on Aug. 18, 2000.

(51) Int. Cl.[7] .................. G02F 1/01; G02F 1/035; G02B 6/12; H04J 14/02
(52) U.S. Cl. .................. 385/14; 385/1; 385/2; 385/3; 385/140; 359/127; 359/130
(58) Field of Search .................. 385/1–3, 14, 37, 385/129, 130, 140; 359/127, 130

(56) References Cited

U.S. PATENT DOCUMENTS

| | | | | |
|---|---|---|---|---|
| 5,002,350 | A | | 3/1991 | Dragone .................. 350/96.15 |
| 6,366,390 | B1 | * | 4/2002 | King et al. .................. 359/264 |
| 6,377,388 | B1 | * | 4/2002 | Sakata et al. .................. 359/321 |
| 6,384,954 | B1 | * | 5/2002 | Webb .................. 359/245 |
| 6,404,526 | B2 | * | 6/2002 | Hakimi et al. .................. 359/161 |
| 2001/0008450 | A1 | * | 7/2001 | Nakazawa .................. 359/124 |
| 2001/0009595 | A1 | * | 7/2001 | Okuno et al. .................. 385/14 |

OTHER PUBLICATIONS

T. Sato et al., "Novel Method for Controlling Passband Flatness in Optical Transparent Networks with Cascaded AWGs", European Conference on Optical Communication, pp. 166–167, 1999.

T. N. Nielsen et al., "3.28–Tb/s (82×40Gb/s) transmission over 3×100 km nonzero–dispersion fiber using dual C– and L–band hybrid Raman/Erbium–doped inline amplifiers", *Optical Fiber Communication Conference*, pp. 236–238, 2000.

* cited by examiner

*Primary Examiner*—Brian Healy
*Assistant Examiner*—Kevin S Wood
(74) *Attorney, Agent, or Firm*—Barry H. Freedman; David A. Sasso

(57) ABSTRACT

The curvature, tilt, and attenuation of the passband of an optical signal is dynamically controlled by an integrated compensator that is advantageously electrically operated. The compensator arrangement can be replicated, and used to independently and dynamically control the passbands of multiple optical signals having different wavelengths, for example in a multiplexing and/or demultiplexing arrangement. Each compensator includes a "50/50" splitter arranged to divide an optical signal into first and second copies. One copy is applied to a first variable optical attenuator (VOA) via a tunable phase shifter, while the other copy is applied to a second VOA directly. The outputs of the first and second VOA's are then combined, for example in a planar waveguide grating. In the output on the other side of the grating, the two copies interfere. When the copy phase shift is zero, the net passband is Gaussian; when the copy phase shift magnitude is $\pi/2$, the net passband is flat; and when the copy phase shift magnitude is between $\pi/2$ and $\pi$, the net passband has a dip in the middle. Thus, the tunable phase shifter controls the passband curvature, and the VOA's control the passband tilt and attenuation level.

10 Claims, 4 Drawing Sheets

DYNAMIC PASSBAND SHAPE COMPENSATION OF OPTICAL SIGNALS

CROSS REFERENCE TO RELATED APPLICATION

This application claims priority of Provisional Application Serial No. 60/226,224 which was filed Aug. 18, 2000.

TECHNICAL FIELD

The present invention relates generally to optical communications, and, in particular, to an arrangement for dynamic passband shape compensation of optical signals. The arrangement can advantageously control the curvature, tilt, and attenuation of the passband shape, in order to reduce the signal distortion caused by other filters in an optical communication network, and can be used in connection with an integrated multiplexer/demultiplexer.

BACKGROUND OF THE INVENTION

As the spectral efficiency of wavelength-division multiplexed (WDM) networks increases, the passband widths of the filters that combine and separate the channels approach the signal bandwidth, making the requirements on the passband shapes more stringent. Transmission lines with many add-drop nodes are especially problematic, since small deviations from the ideal passband shape can accumulate to give significant signal distortion. Also, with the use of optical cross connects, the filters that each channel passes through can change. Thus it would be useful to have a compensator with an adjustable passband shape for each channel that can be used in the multiplexing or demultiplexing stage to correct the signal distortions. It would also be advantageous to have a compensator that can control the curvature of a single passband in a relatively rapid manner, instead of the slow acting filter proposed by Sato, Kaneko, and Horiguchi in a paper entitled "Novel method for controlling passband flatness in optical transparent networks with cascaded AWGs," European Conference on Optical Communication, pp. 166–167, 1999.

SUMMARY OF THE INVENTION

In accordance with the present invention, the curvature, tilt, and attenuation of the passband of an optical signal is dynamically controlled by an integrated compensator that is advantageously electrically operated. The compensator arrangement can be replicated, and used to independently and dynamically control the passbands of multiple optical signals having different wavelengths, for example in a multiplexing and/or demultiplexing arrangement.

Each compensator includes a "50/50" splitter arranged to divide an optical signal into first and second copies. One copy is applied to a first variable optical attenuator (VOA) via a tunable phase shifter, while the other copy is applied to a second VOA directly. Alternatively, both copies can have tunable phase shifters or neither can have a tunable phase shifter but one or both of the VOAs can provide a phase shift. The outputs of the first and second VOA's are then combined, for example in a planar waveguide grating. In the output on the other side of the grating, the two copies interfere. When the copy phase shift is zero, the net passband is Gaussian; when the copy phase shift magnitude is $\pi/2$, the net passband is flat; and when the copy phase shift magnitude is between $\pi/2$ and $\pi$, the net passband has a dip in the middle. Thus, the tunable phase shifter controls the passband curvature, and the VOA's control the passband tilt and attenuation level.

The compensator arrangement can be replicated and used to filter a plurality of individual optical signals having different wavelengths. Thus, the arrangement is particularly useful in connection with a wavelength division multiplexing (WDM) optical communication system.

BRIEF DESCRIPTION OF THE DRAWINGS

The present invention will be more fully appreciated by consideration of the following Detailed Description, which should be read in light of the accompanying drawing in which.

DETAILED DESCRIPTION

Figure 1:
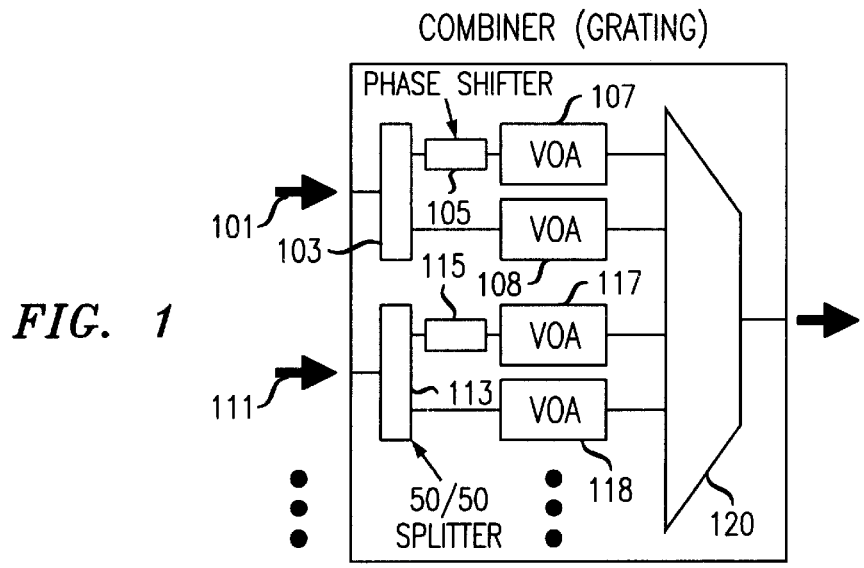
FIG. 1 is a block diagram of an integrated compensator arranged to dynamically control the curvature, tilt, and attenuation of the passband of an optical signal applied to the compensator, in accordance with the principles of the present invention.

FIG. 1 is a block diagram of an integrated compensator arranged to dynamically control the curvature, tilt, and attenuation of the passband of an optical signal applied to the compensator, in accordance with the principles of the present invention. For the purposes of illustration, two individual optical communication signals representing two individual wavelength division multiplex (WDM) channels, are shown as inputs 101 and 111. The present invention could be applied to a single individual optical communication signal at a single wavelength. Obviously, a real WDM optical communication system would have a great many channels (e.g., forty channels) and therefore have a correspondingly increased number of inputs, which additional inputs are not explicitly shown in FIG. 1.

The device works as follows: each of the separated WDM inputs 101 and 111 are split into two copies by 50/50 couplers 103 and 113, respectively, such that each input is divided into two relatively equal copies. One copy (the first copy output from couplers 103 and 113, respectively) passes through a tunable phase shifter 105, 115, respectively, and is then applied to a first variable optical attenuator (VOA). Specifically, the output of tunable phase shifter 105 is applied to first VOA 107, while the output of tunable phase shifter 115 is applied to second VOA 117. For convenience, we will call the copy applied to the phase shifter the "phase shifter copy".

The second copy output from couplers 103 and 113, respectively, (which is not phase shifted) is applied to a second VOA. Specifically, the output of coupler 103 is applied to second VOA 108 while the output of coupler 113 is applied to second VOA 118.

The outputs of the first and second VOA's for each channel are combined in a planar waveguide grating 120, which can, for example, be constructed in a manner described by C. Dragone in U.S. Pat. 5,002,350 issued Mar. 26, 1991 and entitled "Optical Multiplexer/Demultiplexer". Note that, in order to achieve better crosstalk when the present invention is used as a demultiplexer, the spacing between (a) a pair of waveguides for a first channel, and (b) a pair of waveguides for the adjacent channel, should be 2.27a, where a is the center-to-center spacing between the two waveguides in the each of the channels. Note also that the path lengths from the 50/50 couplers 103, 113 to the grating 120 are advantageously made the same, to within a few wavelengths, so that the filter chromatic dispersion will be reduced or eliminated.

In the output on the other side of the grating 120, the two copies of the optical signals at each wavelength interfere. When the phase shift of the phase shifter copy with respect to the other copy, is zero, the net passband is Gaussian; when the magnitude of the phase shift of the phase shifter copy with respect to the other copy is $\pi/2$, the net passband is flat; and when the magnitude of the phase shift of the phase shifter copy with respect to the other copy is between $\pi/2$ and $\pi$, the net passband has a dip in the middle. Thus, phase shifter 105, 115 controls the passband curvature, and the VOA's 107, 108, 117 and 118 control the passband tilt and attenuation level of the optical signals output from grating 120.

Note that the present invention can also be implemented by (a) using two different tunable phase shifters to respectively operate on both of the copies, keeping in mind that the difference between the phase shifts produced by the shifters is to be controlled, or (b) disposing one or both of the phase shifters in the VOA's, as opposed to in the optical paths connected to the VOA's.

The compensator arrangement of the present invention is useful as a WDM multiplexer, when a plurality of inputs having different wavelengths are to be combined into a single output. In this embodiment, each of the plural inputs is (a) applied to an individual splitter, (b) wherein one of the splitter outputs is phase shifted with respect to the other output, and (c) both optical signals are then applied to individual VOA's (d) before being recombined in a grating or other combiner that is common to all of the WDM wavelengths. Advantageously, when the arrangement is used as a multiplexer rather than a demultiplexer, the effects of crosstalk do not matter, because a multiplexer is intended to combine separate inputs into a single output, and polarization dependence likewise does not matter, as long as polarization-maintaining fiber connections to the sources are used. Furthermore, the VOA's can be used to equalize the launched channel powers.

Note that, because the device is reciprocal, the arrangement of the present invention can be used in the other direction as a demultiplexer. In the demultiplexer arrangement, the filter shape is the same as for the multiplexer arrangement. Accordingly, an incoming multiplexed signal containing a plurality of WDM optical channels at different wavelengths can be demultiplexed into plural separate optical signals having different wavelengths.

Theoretically the arrangement of the present invention does not incur any "additional" loss in an optical system, by an experiment that operated the present invention with the copy phase shift set to zero. We found that, in this configuration, the passband center had no excess loss as compared to a conventional multiplexer with VOA's. In our design, we limited the grating angular aperture to $\lambda/a$ for collecting the light from the waveguide array, where a is the center-to-center spacing between the two waveguides containing the copies for each channel at their connection to the grating. This means that if we made two cascaded identical gratings connected by the waveguide array, the response could be perfectly flat with theoretically zero loss. Thus the two passbands between each copy and the output must cross at their 3-dB points, and so they add up to unity transmissivity at a peak when they are in phase.

Figure 2:
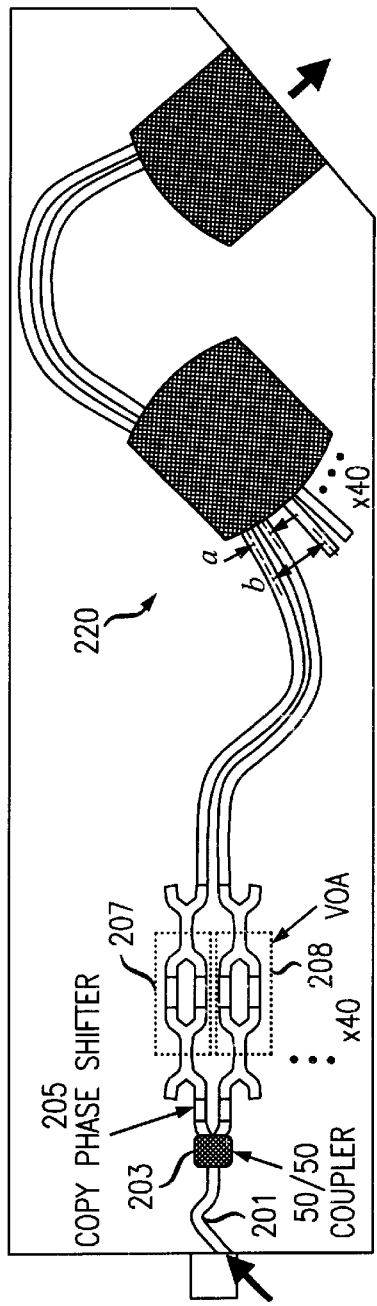
FIG. 2 is a waveguide layout of the integrated compensator of FIG. 1.

FIG. 2 is a waveguide layout of an exemplary implementation of the integrated compensator of FIG. 1, having an overall device size of approximately 9 cm×2.5 cm. The waveguides within the compensator are 6.8 $\mu$m-high silica cores in silica on a silicon substrate; the core index is 0.65% higher than the cladding. One input signal applied on input 201 is divided into two equal copies illustratively by a 50/50 star coupler 203, the output of which is applied to first and second VOA's 207 and 208. One of the copies is applied directly to VOA 208, while the other is applied via a copy phase shifter 205. The VOA's 207 and 208 are Mach-Zehnder interferometers with a phase shifter in one arm. These phase shifters, as well as copy phase shifter 205, may be activated thermo-optically via a chrome heater placed adjacent to the waveguide. Couplers in the VOA's can be evanescent couplers, while, as previously stated, coupler 203 can be a star coupler because of its accurate splitting ratio. However, any coupler known in the art could be used, such as multimode interference couplers, y-branch couplers, etc. The outputs of VOA's 207 and 208 are applied to a grating 220 arranged such that (a) the center-to-center spacing between the two waveguides in the each of the channels is a, (b) the spacing between waveguides in one pair and the adjacent pair is b, and (c) the ratio of b/a is approximately 2.27. Although only a single input 201 is shown in FIG. 2, it is understood that a plurality of inputs (e.g., a total of 40 inputs) having different wavelengths, could be accommodated.

In one embodiment of the present invention implemented as a 40 channel multiplexer and realized in the laboratory, a 40-fiber assembly was glued to the left-hand side of a chip on which the components of FIGS. 1/2 were arranged, and the output fiber was glued directly to the output portion of the grating 120/220. All 120 phase shifter heaters (3 heaters per WDM channel) were led to the edge of the chip by patterned gold electrodes, which were wire-bonded to a fanout board leading to two 64-pin connectors. These were then connected to 120 computer-controlled digital-to-analog converters and amplifiers.

In order to more fully appreciate the mechanism by which the present invention is operated and adjusted, a simple model of the device that can be used in a transmission line simulator was created. The amplitude transmissivity through the device as a function of optical frequency is approximately $$t(f) = \frac{\sum_p \exp\left(-3\frac{p^2}{M^2}\right)\exp\left[j\frac{2\pi p(f-f_0)}{2\Delta fN}\right]\left[a_1\exp\left(j\frac{2\pi p}{2M}\right) + a_2\exp\left(-j\frac{2\pi p}{2M} + j\phi\right)\right]}{\sqrt{2}\sum_p \exp\left(-3\frac{p^2}{M^2}\right)} \quad (1)$$

where p=m−(M+1)/2, in which m runs from 1 to M, the number of waveguide grating arms; $f_0$ is the center frequency; Δf is the frequency spacing between simulation points; N is the number of points in the simulation; ϕ is the copy phase; and $a_1$ and $a_2$ are the attenuation levels of the two VOA's. M can be found using the formula M≈round (2.4ΔfN/b), where b is the 3-dB frequency passband width when ϕ=0.

Figure 3:
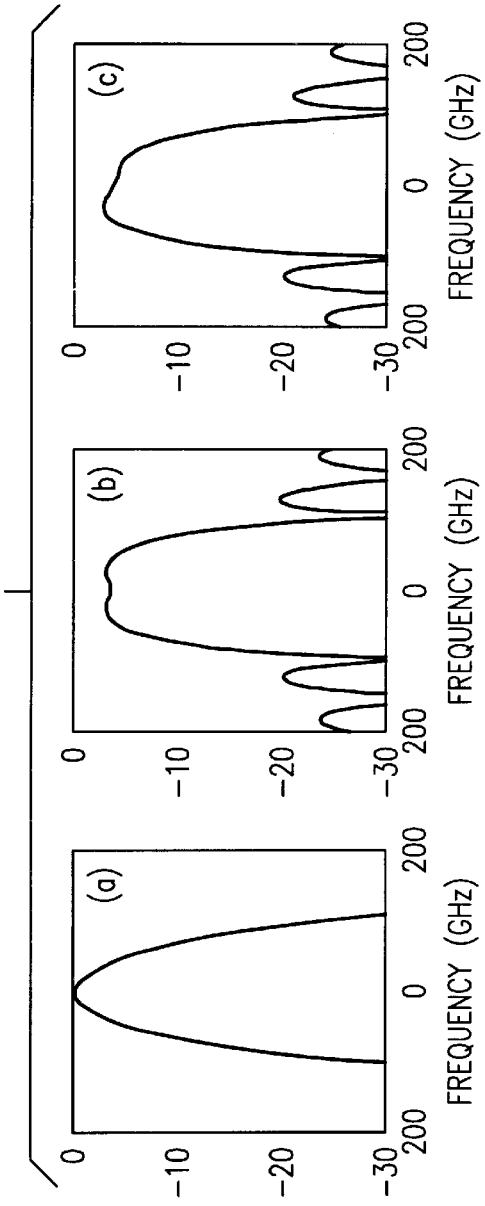
FIG. 3 is a diagram illustrating the calculated passbands using Eq. (2) for (a) copy phase is 0, (b) copy phase is $\pi/2$, and (c) copy phase is $\pi/2$ with one VOA set for higher attenuation.

FIG. 3 is a diagram that shows plots of $|t(f)|^2$ with N=2000, Δf=0.5 GHz, and b=75 GHz. In FIG. 3(a), the copy phase ϕ is 0 and $a_1=a_2=1$. In FIGS. 3(b) and 3(c), the copy phase ϕ is π/2. The difference between FIGS. 3(b) and 3(c) is that, in FIG. 3(b), $a_1=a_2$, while in FIG. 3(c), one VOA is set for higher attenuation than the other.

Figure 4:
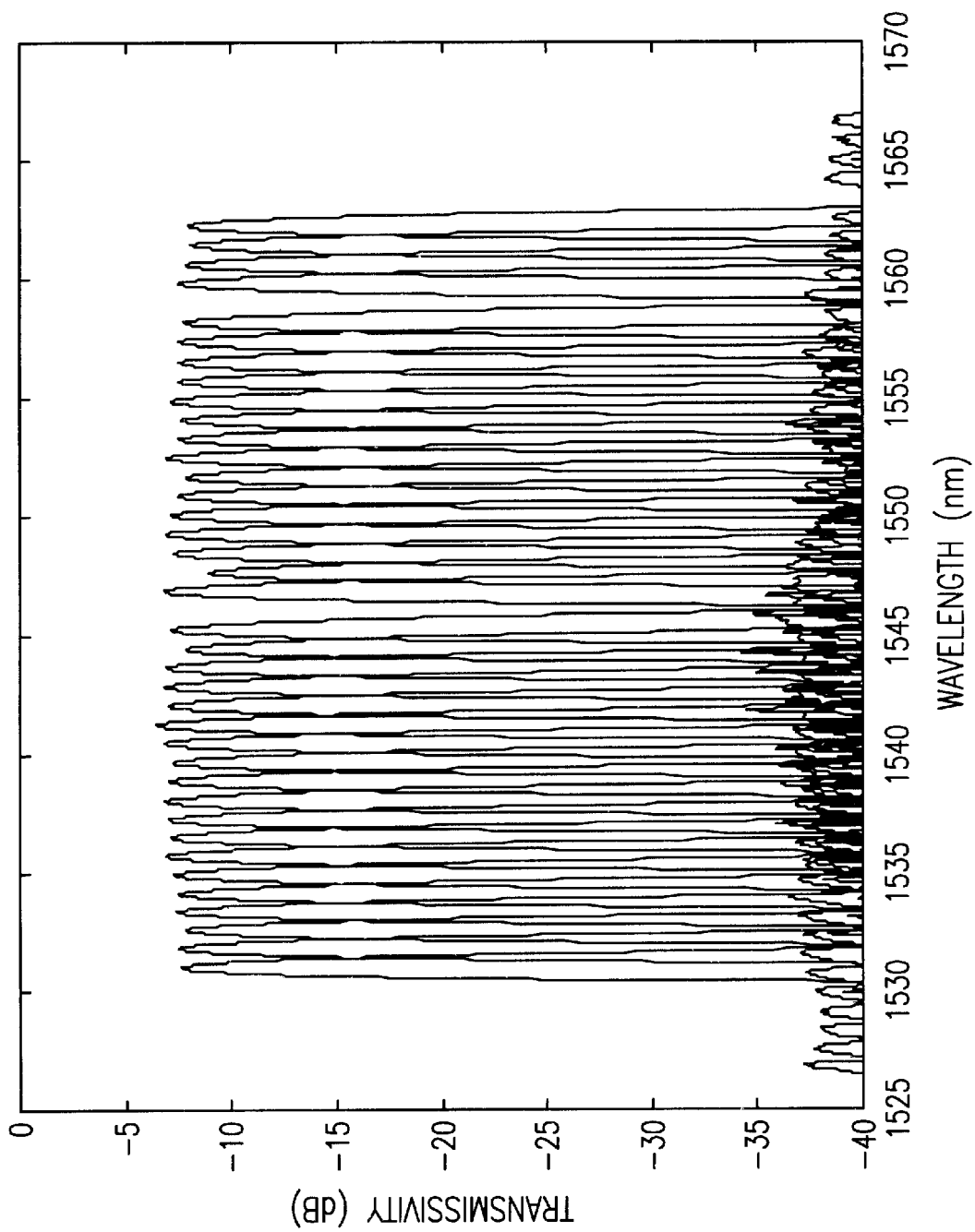
FIG. 4 is a diagram illustrating the measured passbands when the copy phase is zero for all 40 channels, except channels 20 and 36, which had broken phase shifters.

FIG. 4 is a diagram illustrating the measured passbands when the copy phase is zero for all 40 channels. (Note that in the results shown in this figure, channels 20 and 36 are not present, since those channels had broken phase shifters.) The 3-dB width is ~0.56 nm. The loss is ~7.5 dB.

Figure 5:
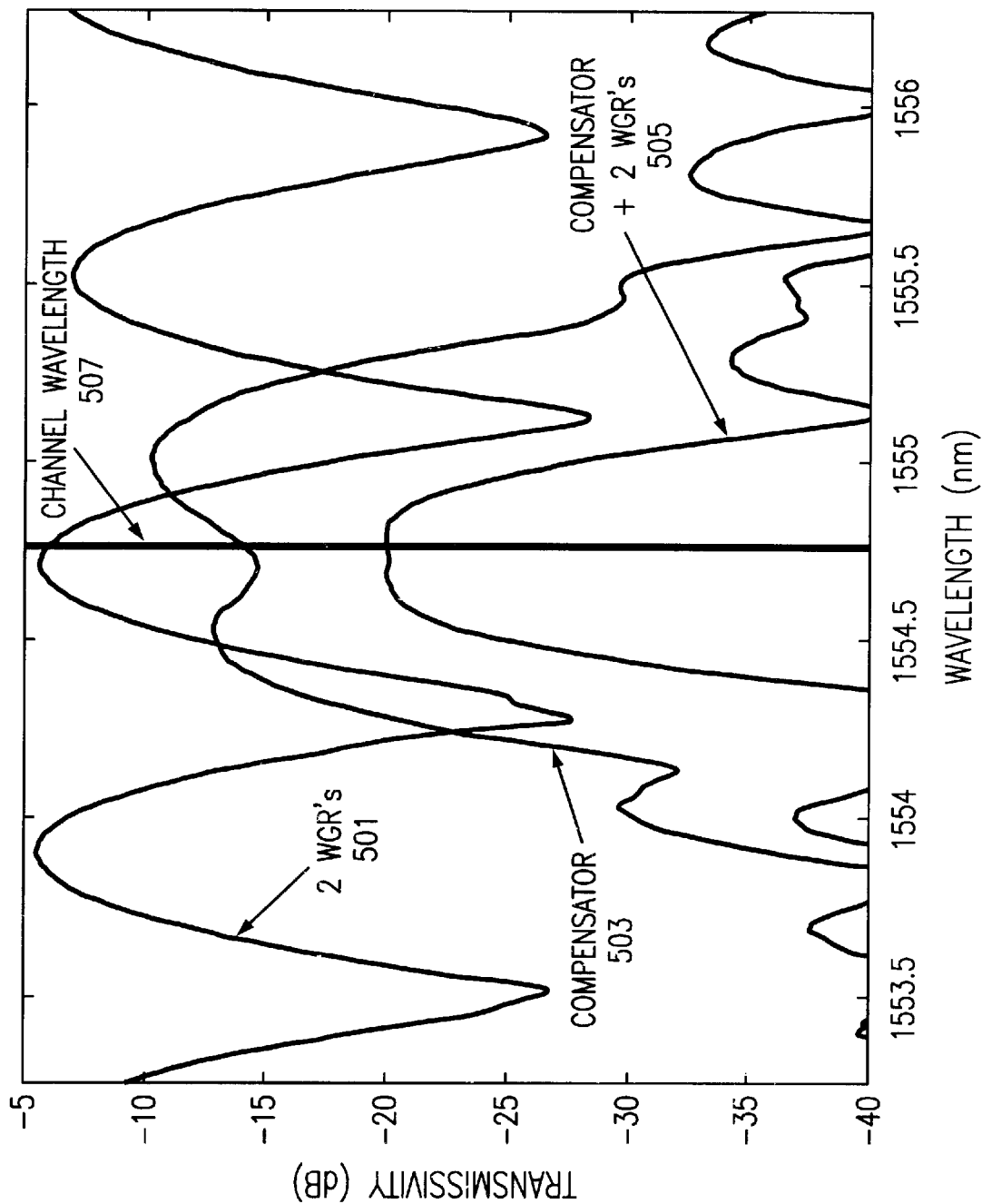
FIG. 5 is a diagram illustrating the measured passbands in the 40 Gb/s experiment. Upper trace: cascade of the two Gaussian WGR's, middle trace: adjusted passband of the compensator, and lower trace: cascade of the WGR's plus the compensator. Resolution bandwidth=0.05 nm.

FIG. 5 is a diagram illustrating the measured passbands in a 40 Gb/s experiment, using an extreme case: 40-Gb/s return-to-zero (RZ) data passing through a narrow add-drop passband. The transmitter and receiver are the same as described by T. N. Nielsen, et. al., "3.28-Tb/s (82×40 Gb/s) transmission over 3×100 km nonzero-dispersion fiber using dual C- and L-band hybrid Raman/Erbium-doped inline amplifiers," Optical Fiber Communication Conference, PD23, 2000, except that the transmitter includes a $LiNbO_3$ modulator driven at 20 GHz to create the RZ signal. A pair of waveguide grating routers (WGR's) with Gaussian passbands with a combined 3-dB bandwidth of 0.29 nm were placed in the transmission line to simulate an optical add-drop node. The combined passband was offset by 0.1 nm from the channel center wavelength (see the uppermost trace 501 of FIG. 5). The center wavelength of the channel we used, which is channel 31 on the ITU grid, is shown as the thick line 507 in FIG. 5. The upper trace 501 shows the cascade of the two Gaussian WGR's, the middle trace 503 shows the adjusted passband of the compensator, and lower trace 505 shows the cascade of the WGR's plus the compensator. Resolution bandwidth=0.05 nm.

Figure 6:
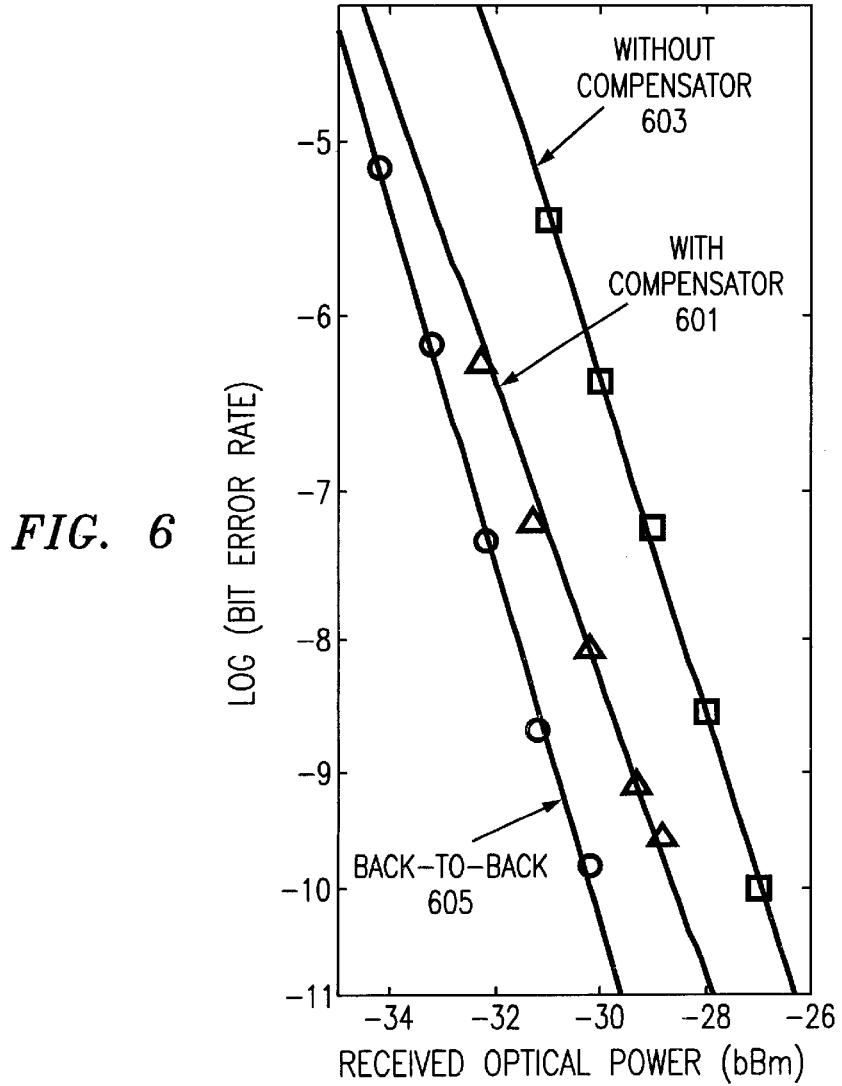
FIG. 6 is a diagram illustrating the measured bit-error rate of the different cases. The pattern length is $2^7-1$.

FIG. 6 is a diagram illustrating the measured bit-error rate with (trace 601) and without (trace 603) the compensator arrangement of the present invention. For reference purposes, the ideal situation, represented when the transmitter and receiver are directly connected, is also shown (trace 605). The pattern length is $2^7-1$. We measured a power penalty of 3.2 dB at a bit-error rate (BER) of $10^{-9}$ over the back-to-back case. We then inserted the compensator that was wavelength-aligned to the ITU grid via the waveguide grating temperature. We adjusted the phase shifters for channel 31 to make the total cascaded passband as flat as possible. The phase shifters require ~410 mW/π, and the thermal crosstalk between channels is nearly negligible. The present invention compensates both the passband narrowing (the new 3-dB bandwidth is 0.40 nm) and the wavelength offset. The BER penalty was reduced to 1.4 dB. Attempts at increasing the resulting passband width further caused a dip in the middle of the passband, which increased the BER penalty again.

We claim:

1. An integrated electrically operated compensator for dynamically controlling the curvature, tilt, and attenuation of the passband of an optical signal, comprising
    a splitter arranged to divide an optical signal into first and second copies,
    means for applying said first copy to a first variable optical attenuator (VOA) via a tunable phase shifter,
    means for applying said second copy directly to a second VOA, and
    means for combining the outputs of said first and second VOA's.

2. The invention defined in claim 1 wherein said combining means is a planar waveguide grating.

3. A wavelength division multiplexing (WDM) optical communication system comprising
    a plurality of splitters each arranged to divide a respective one of a plurality of optical signals into first and second copies,
    means for applying each said first copy to a respective first variable optical attenuator (VOA) via a respective tunable phase shifter,
    means for applying each said second copy directly to a respective second VOA, and
    means for combining the outputs of said all of said first and second VOA's.

4. A wavelength division multiplexer (WDM) for combining a plurality of optical inputs having different wavelengths into a single output, comprising
    means for applying each of the plural optical inputs to an individual splitter, wherein one of the optical outputs of each splitter is phase shifted with respect to the other optical output of said each splitter,
    means for applying both resulting optical signals to individual variable optical attenuators (VOA's), and
    means for recombining the outputs of all of said VOA's.

5. The invention defined in claim 4 where said recombining means is a grating common to all of the WDM wavelengths.

6. The invention defined in claim 1 or 3 wherein said first and second variable optical attenuators are Mach-Zehnder interferometers with a phase shifter in one arm.

7. The invention defined in claim 6 wherein at least one of said phase shifters are controlled by an electrical heater.

8. The invention defined in claim 1 or 3 wherein said splitter is a 50/50 star coupler.

9. An integrated electrically operated compensator for dynamically controlling the curvature, tilt, and attenuation of the passband of an optical signal, comprising
    a splitter arranged to divide an optical signal into first and second copies,
    first means for applying said first copy to a first variable optical attenuator (VOA),
    second means for applying said second copy to a second VOA, and
    means for combining the outputs of said first and second VOA's,
    wherein either said first or said second copy is applied to a tunable phase shifter.

10. An integrated electrically operated compensator for dynamically controlling the curvature, tilt, and attenuation of the passband of an optical signal, comprising
    a splitter arranged to divide an optical signal into first and second copies,
    first means for applying said first copy to a first variable optical attenuator (VOA),
    second means for applying said second copy to a second VOA, and
    means for combining the outputs of said first and second VOA's,
    wherein either said first or said second VOA's includes a tunable phase shifter.

* * * * *